United States Patent [19]

Frugé

[11] Patent Number: 5,148,338
[45] Date of Patent: Sep. 15, 1992

[54] DISK DRIVE SPINDLE HUB ASSEMBLY

[75] Inventor: Tave J. Frugé, Colorado Springs, Colo.

[73] Assignee: Digital Equipment Corporation, Maynard, Mass.

[21] Appl. No.: 612,768

[22] Filed: Nov. 14, 1990

[51] Int. Cl.5 .................................................. G11B 17/04
[52] U.S. Cl. .............................. 360/98.07; 360/97.02; 360/99.08; 360/98.01
[58] Field of Search ............... 360/98.07, 97.02, 99.08, 360/98.01, 97.03, 133, 135

[56] References Cited

U.S. PATENT DOCUMENTS

| | | | |
|---|---|---|---|
| 4,054,931 | 10/1977 | Bolton et al. | 360/97 |
| 4,535,373 | 8/1985 | Schuh | 360/98.07 |
| 4,672,487 | 6/1987 | Brand et al. | 360/97 |
| 4,713,704 | 12/1987 | Voll et al. | 360/99.08 |
| 4,717,977 | 1/1988 | Brown | 360/98.07 |
| 4,739,427 | 4/1988 | Kilmer et al. | 360/97 |
| 4,743,995 | 5/1988 | Castle et al. | 360/98 |
| 4,779,165 | 10/1988 | Elsaesser et al. | 360/97 |
| 4,814,652 | 3/1989 | Wright | 360/98.07 |
| 4,818,907 | 4/1989 | Shirotori | 360/97.02 |
| 4,843,500 | 6/1989 | Elsässer et al. | 360/97.02 |
| 4,882,643 | 11/1989 | Shirotori | 360/99.08 |
| 4,899,237 | 2/1990 | Tochiyama et al. | 360/98.02 |
| 4,905,110 | 2/1990 | Krum et al. | 360/99.08 |
| 4,922,406 | 5/1990 | Schuh | 360/97.03 |
| 4,928,029 | 5/1990 | Wright | 360/99.08 |
| 4,943,748 | 8/1990 | Shiozawa | 360/98.07 |

Primary Examiner—Aristotelis Psitos
Assistant Examiner—Alfonso Garcia
Attorney, Agent, or Firm—Ronald E. Myrick; Barry N. Young; N. Rhys Merrett

[57] ABSTRACT

A disk drive for magnetic data storage media includes a spindle bearing arrangement having a rotatable portion surrounding and mounted by bearings on a stationary portion. A spindle hub having a cylindrical outer surface and a concentric interior cavity is rigidly attached to the rotatable portion of the spindle bearing arrangement. The cylindrical outer surface of the spindle hub provides a mounting surface for a stack of storage disks. A brushless direct current motor is mounted within the hub cavity. The rotor of the motor includes a sleeve rigidly attached to the floor of the spindle hub cavity and providing a return flux path for the motor. The spindle hub and the sleeve have distinct coefficients of thermal expansion and a radial spacing between the sleeve and the spindle hub allows for unconstrained thermal expansion of the sleeve and the spindle hub. The hub cavity floor incorporates a concentric annulus for accurate centering of the sleeve within the cavity.

12 Claims, 3 Drawing Sheets

DISK DRIVE SPINDLE HUB ASSEMBLY

FIELD OF THE INVENTION

This invention relates to data storage disk drives and more particularly to spindle driving mechanisms with a motor construction interior to a driven hub for attachment of one or more data storage disks.

BACKGROUND OF THE INVENTION

Data storage disk drives are used for high volume storage of data capable of being written or read by means of a special head arrangement while the disks are rotated on a spindle mechanism at a predetermined speed. The data in a suitable form resides in circular tracks disposed concentrically on the disk surface. To increase the amount of data to be stored on a disk drive device such as a hard magnetic disk drive, several hard magnetic disks are rigidly secured to a rotational spindle hub together in a suitable disk stack configuration.

To ensure reliable data transfer and storage operation of the disk drive, the hard disk stack must be accurately positioned on the spindle hub relative to the spindle's axis of rotation. Also, relative radial displacement between the read/write head and a desired disk track must be tightly controlled.

In practice, the spindle hub and the attached disks are rotated by means of a direct current brushless motor which is enclosed inside the hub so as to reduce a space requirement for the spindle driving mechanism.

To complete the motor flux return path and shield the disk surfaces from stray magnetic interference, a soft iron or steel sleeve of generally cylindrical shape and having desirable magnetic properties is usually inserted inside the spindle hub. The sleeve is also used to carry the permanent magnet part of the motor which is generally bonded to the inside wall of the sleeve. The hub and disks are generally made of the same material, e.g. an aluminum alloy, or of materials with the same coefficient of thermal expansion to ensure that thermal expansion of the hub and the disks, inherent in normal disk drive operation, does not result in undue distortion of the hub and dislocation of the disks from their desired spatial orientation.

In the past, fastening the sleeve to the spindle hub was accomplished by adhesively bonding the sleeve's outside wall to the inside wall of a cavity within the hub. The need to insert the motor inside the cavity resulted in the walls of the spindle hub in the vicinity of the sleeve attachment being substantially thinner than the remainder of the hub's construction. As a consequence, the spindle hub/sleeve interface was susceptible to increased stresses and deformation incident upon the disparity in the material and thermal expansion properties of the sleeve and the spindle hub. Under typical operating conditions of a disk drive, unequal thermal expansion of the sleeve and the hub would result in significant distortion of the hub's cavity wall displacing the disks adjacent to the wall relative to the read/write heads and the remaining disks. The hub shoulder, which is used to support the bottom disk, may undergo similar displacement. The resultant disk misalignment on the order of as little as several microinches is highly undesirable because of its deleterious effect on the spindle balance and disk track eccentricity. The latter problem is a cause of the so-called disk runout and track offset which adversely affects the accuracy and speed of positioning the read/write heads relative to the desired disk track. This in turn results in longer data access times and potential data transfer errors which degrade reliable operation of the disk drive.

To alleviate the problem of the hub's thermal distortion it was known to reduce the length of the adhesive bond between the sleeve and the hub. However, this measure generally results in only a partial improvement.

An alternative approach tried in the past is to construct the spindle hub and the sleeve of the same ferromagnetic material. With the two parts expanding and contracting at the same rate, the distortion of the hub is avoided. However, since the disks are invariably made of a non-ferromagnetic substrate, such as as an aluminum alloy, there is a thermally induced distortion of the disks at the spindle hub/disk junction.

SUMMARY OF THE INVENTION

The invention is a disk drive wherein a spacing is provided between the inside surface of the cavity wall of the spindle hub and the outside surface of the sleeve thereby permitting free thermal expansion of these members to occur without distortion of the cavity wall.

To attach the advantageously sleeve is to the spindle hub, the sleeve is provided with a flange structure bent substantially inwardly relative to the body of the sleeve, the flange being preferably designed as a solid planar member disposed generally at right angles to the body of the sleeve to provide a cup-shaped sleeve structure. According to a preferred embodiment of the invention, a sufficient number of circumferentially equally spaced holes is provided in the flange which, when aligned with a like number of tapped holes made in a sleeve mounting surface inside the cavity of the spindle hub, is used to rigidly attach the sleeve to the spindle hub by means of screws driven through the aligned holes. In addition, an integral member of preferably annular shape is machined into the sleeve mounting surface within the cavity of the spindle hub, while the sleeve flange is provided with a corresponding bore concentric with the annulus of the spindle hub. The diameter of the flange bore is preferably chosen to be slightly larger than the outside diameter of the annulus so as to provide a small clearance for accurate and easy centering of the sleeve on the hub. One advantage of this embodiment the invention is that direct contact between the sleeve and the spindle hub can be transferred substantially toward the strongest part of the hub's construction proximal to its centerline thereby preventing thermally induced distortion of the hub's cavity wall. Another advantage of the preferred embodiment of the invention is that the post-assembly movement of the sleeve relative to the spindle hub is limited by the clearance between the diameter of the sleeve's flange and the outside diameter of the annulus of the spindle hub. Yet another advantage of this embodiment of the invention is that ease of disassembly is permitted of the sleeve and the spindle hub for subsequent re-work and/or part adjustment. Still another advantage is that this embodiment of the invention may be implemented the use of adhesive bonding for sleeve and hub attachment. Assembly operations involving adhesive bonding are lengthy and complex procedures which are difficult to control in the clean room environment typically required in disk drive manufacturing. Furthermore, bond failure over time may result in dangerous contamination of the disk surface and excessive wear of components at the disk/read-write head interface.

According to a modified embodiment of the invention, the diameter of the flange bore and the outside diameter of the annulus can be made to overlap producing a slight interference fit when the sleeve and the spindle hub are assembled together. This advantageously results in greater centering accuracy of the sleeve with respect to the spindle hub and serves to arrest any post-assembly displacement of the sleeve relative to the spindle hub.

Yet another approach to centering the sleeve on the spindle hub, according to another embodiment of the invention, is to design the flange bore diameter and the annulus outside diameter with a larger interference so as to accurately center and rigidly attach the sleeve to the spindle hub by means of a suitable heat shrink assembly. A further advantage of this method is that the fastening screws, otherwise required for the sleeve and spindle hub assembly, are dispensed with.

BRIEF DESCRIPTION OF THE DRAWINGS

A more detailed understanding of the invention may be had from the following description of the preferred embodiments, given by way of example, to be read in conjunction with the accompanying drawings, wherein.

DETAILED DESCRIPTION

Figure 1:
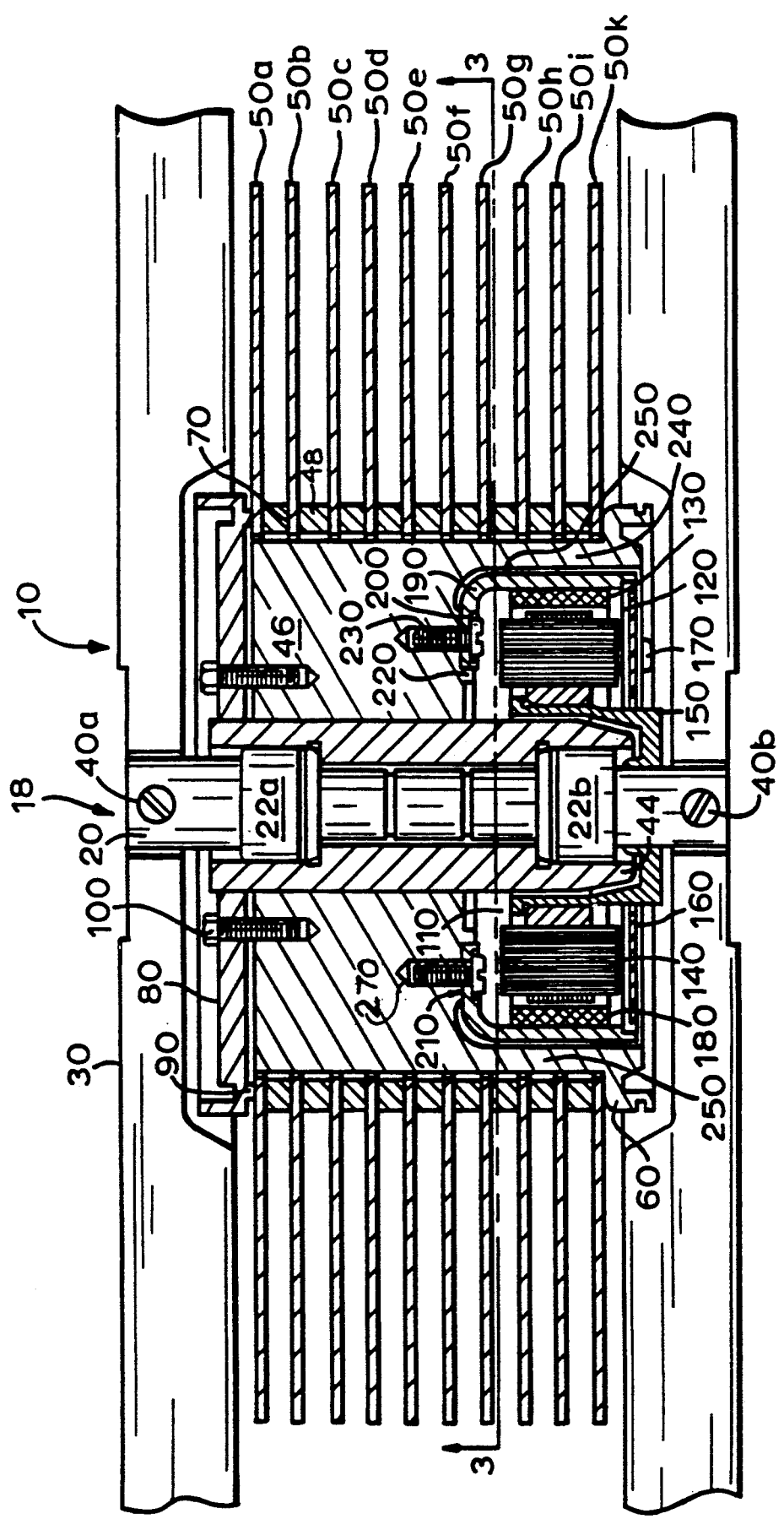
FIG. 1 is a cross-sectional view of a spindle driving mechanism assembly for disk drives, according to a preferred embodiment of the invention.
Figure 2:
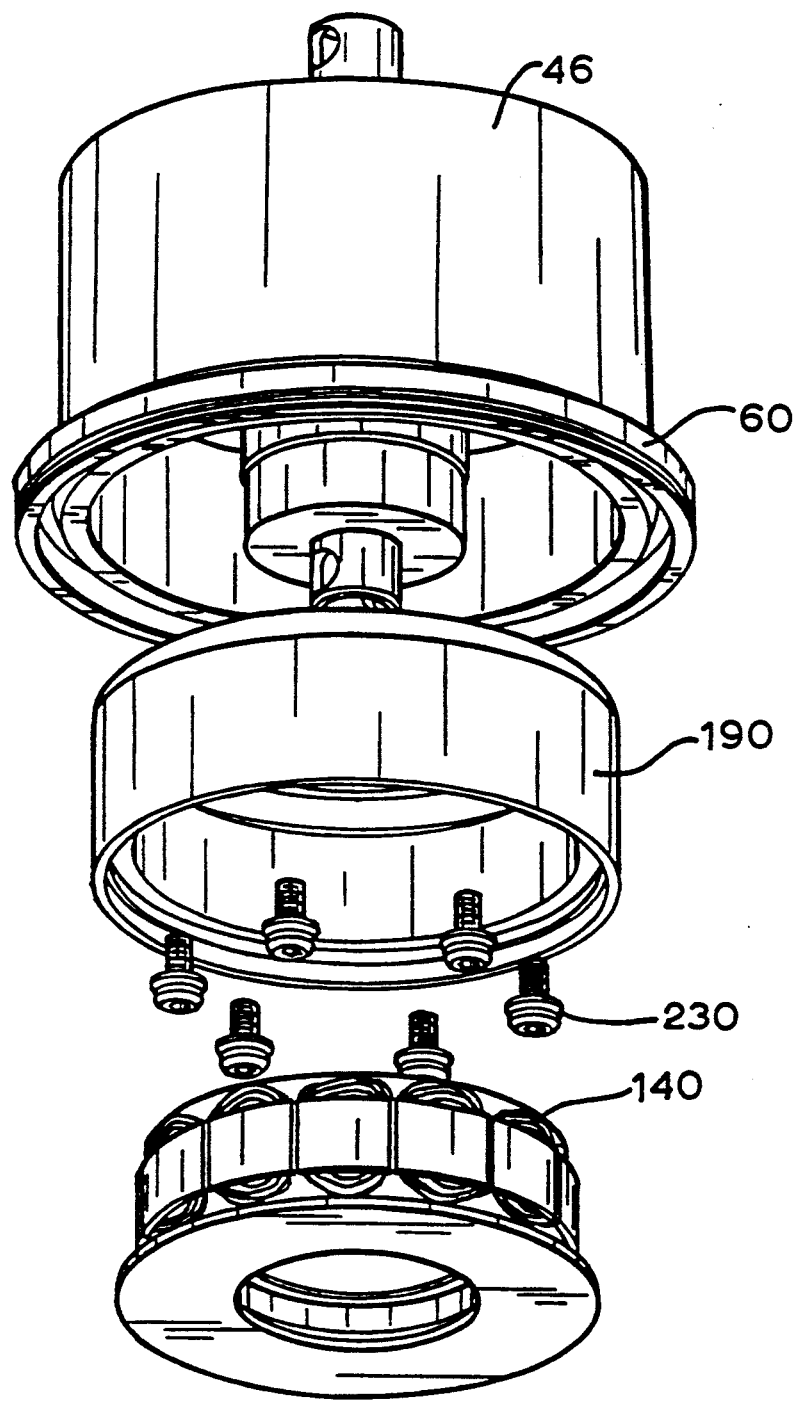
FIG. 2 is an exploded perspective view of the spindle hub and sleeve assembly of FIG. 1.
Figure 3:
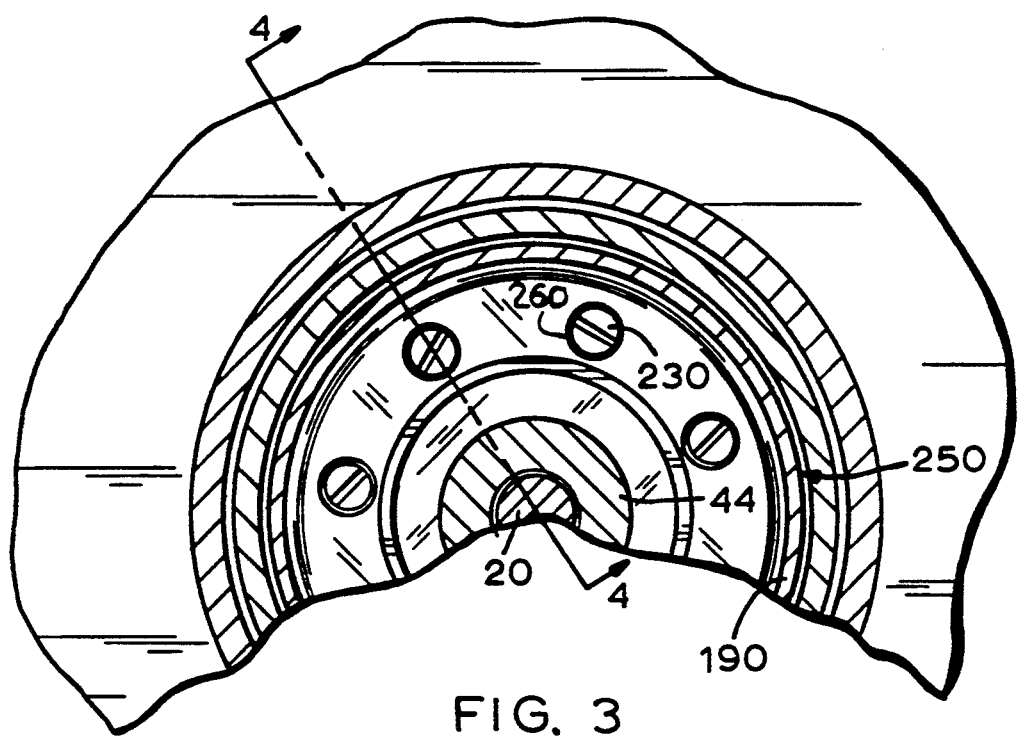
FIG. 3 is an enlarged cross-sectional view of the spindle hub and sleeve assembly of FIG. 1 as viewed in the direction of line 3—3 in FIG. 1.
Figure 4:
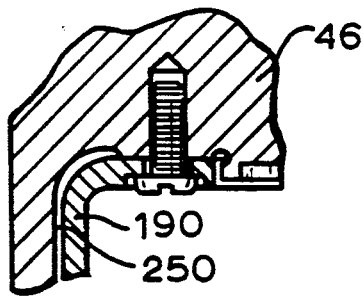
FIG. 4 is an enlarged cross-sectional view, taken along line 4—4 in FIG. 3, depicting the preferred way of attaching the sleeve to the spindle hub.

Referring now to the drawings, and particularly to FIG. 1, there is shown a portion of a disk drive 10 having a spindle bearing arrangement 18 with a stationary portion 20 mounted and fixedly attached to a baseplate 30 by means of screws 40a and 40b. Encircling stationary portion 20 at upper and lower ends thereof are bearings 22a, 22b. Spindle bearing arrangement 18 further includes a rotatable portion 44 coacting with bearings 22a, 22b which encloses stationary portion 20 and is used to securely attach a spindle hub 46 centering it relative to the longitudinal centerline of stationary portion 20. Spindle hub 46 is externally configured to have a substantially cylindrical disk mounting surface 48 for data storage disks 50a through 50k whose inside bore diameter is made to correspond with the outside diameter of spindle hub 46. A hub shoulder 60, shaped as an integral member, extends generally radially from the lower edge of spindle hub 46 and serves to support data storage disks 50a through 50k in spatially separated relation from each other effected by annular spacer rings 70 in order to ensure access to the disk surface for data storage and transfer operations. A clamp ring 80 provided with a retaining lip 90 is attached to spindle hub 46 by means of clamp ring screws 100 in such a manner as to bring retaining lip 90 into intimate contact with upper data storage disk 50a whereby a clamping force is produced sufficient to fixedly attach data storage disks 50a through 50k to spindle hub 46.

In order to reduce space requirements within the disk drive, spindle hub 46 is provided with a substantially cylindrically shaped hub cavity 110 to enclose a brushless direct current motor 120 with a stator lamination 130 carrying a stator winding 140 and bonded to a stator cup 150 which is press-fitted concentrically onto stationary portion 20 preferably at the bottom thereof within cavity 110. A printed circuit board 160, attached to stator cup 150 generally below stator winding 140, carries, inter alia, Hall effect position sensors, winding terminals, and a winding connector 170. The stator components are thus affixed or made stationary on stationary portion 20.

Spindle hub 46 and data storage disks 50a–50k are preferably made from a material with poor magnetic properties, e.g. an aluminum alloy. A plurality of discrete contiguously disposed segments of a magnet or an integrally formed annular permanent magnet 180 is attached or bonded to the inner surface of a sleeve 190 made from steel or other magnetically conducting material. The sleeve is used to confine the motor's magnetic field substantially within hub cavity 110 by providing an adequate magnetic flux return path and also serves to prevent stray magnetic field interference with the data read/write operation occurring on the disk surface.

In this embodiment, sleeve 190 is provided with an integral flange 200 which extends substantially inwardly with respect to the body of sleeve 190 adjacent one end thereof and has a plurality of circumferentially equally disposed holes or apertures 260 (only one of which is shown) drilled through its thickness. An equal number of tapped holes or apertures 270 (only one being shown) located in the same pattern as apertures 260 in flange 200, is made in a sleeve mounting surface 210 (provided by the spindle hub 46) which is formed preferably perpendicular to cavity wall 240 inside hub cavity 110. Additionally, a sleeve centering member preferably in the form of an annulus 220 is machined into sleeve mounting surface 210 concentric to stationary portion 20. Following this embodiment, flange 200 is provided with a central bore whose diameter is made to be slightly larger than the outside diameter of annulus 220. To attach sleeve 190 to spindle hub 46, and thus form, along with magnet 180, the rotor portion of brushless direct current motor 120, annulus 220 is inserted into flange 200, the respective holes in sleeve 190 and spindle hub 46 are aligned and the two members are attached by suitable fastening means, such as screws 230, driven through the holes. In the represented embodiment, any movement of sleeve 190 relative to spindle hub 46 is advantageously constrained to lie within the clearance between the bore diameter of the flange 200 and the outside diameter of annulus 220. Cavity wall 240 is generally made in the form of a cylinder whose inner diameter is larger than the outside diameter of the body of sleeve 190 so as to provide a substantially radial annular spacing 250 therebetween sufficient to allow unconstrained thermal expansion of sleeve 190 and cavity wall 240 relative to each other. This effectively prevents contact between sleeve 190 and hub wall 240 whereby the hub wall, no longer compelled to conform to the unequally expanding sleeve, is protected from undue distortion which would otherwise result in undesirable displacement of the data storage disks attached to spindle hub 46.

Figure 5:
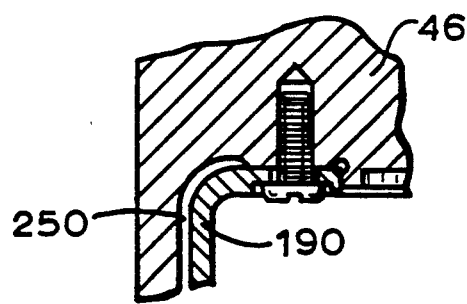
FIG. 5 is an enlarged cross-sectional view similar to FIG. 4 depicting an alternative way of attaching the sleeve to the spindle hub.
Figure 6:
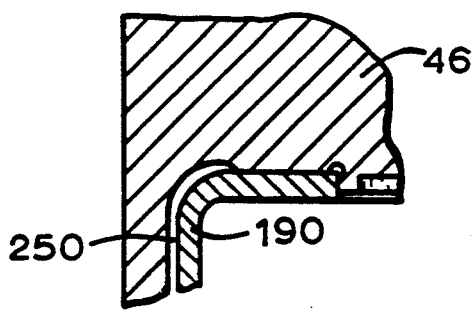
FIG. 6 is an enlarged cross-sectional view similar to FIG. 4 depicting yet another alternative way of attaching the sleeve to the spindle hub.

FIGS. 5 and 6 depict alternative arrangements for coupling sleeve 190 to spindle hub 46 within cavity 110. The embodiment detailed in FIG. 5 follows substantially that of FIGS. 1 through 4. However, the diameter of the bore in flange 200 is made slightly smaller than the outside diameter of annulus 220 in order to produce a degree of interference therebetween sufficient to arrest any movement of sleeve 190 relative to spindle hub 46.

In the embodiment of FIG. 6, the diameter of the bore in flange 200 and the outside diameter of annulus 220 are made to result in a degree of interference sufficient to press sleeve 190 onto spindle hub 46 by means of a heat shrink assembly operation. The junction thus formed not only prevents all relative movement between sleeve 190 and spindle hub 46 but ensures that the sleeve is held securely in place so that the use of screws for sleeve attachment is avoided.

It is possible to resort to other sleeve coupling arrangements provided they effect spatial separation between hub wall 240 and sleeve 190 which is adequate to accommodate the difference in their thermal expansion properties. For example, flange 200 may be oriented at any suitable angle with respect to sleeve 190 and hub wall 240 or it may be executed as a separate member or a plurality of members having required configuration and attached to sleeve 190. Annulus 220 may be replaced with an equivalent recess, step, or land, or made as a separate member, and attached to either spindle hub 46 or rotatable portion 44, provided that the required centering of sleeve 190 can be achieved.

The foregoing description of the embodiments is offered solely by way of illustration of the underlying principles of the invention. Many changes, modifications, and variations apparent to those skilled in the art may suggest themselves and are to be taken as embraced within the spirit and the scope of the appended claims.

What is claimed is:

1. A disk drive comprising:
a spindle bearing arrangement defining an axis of rotation, said spindle bearing arrangement having a stationary portion and a rotatable portion;
means for mounting and supporting said spindle bearing arrangement within said disk drive;
a spindle hub having an outer surface and a generally cylindrically shaped cavity within the confines of said outer surface, said cavity having a predetermined diameter defining an inside cavity wall
means for fixedly attaching said spindle hub to said rotatable portion of said spindle bearing arrangement;
sleeve means having a generally cylindrically shaped body portion provided with an inside wall and an outside wall, said outside wall having a diameter less than the predetermined diameter of said cavity, said sleeve means being made from a material with a coefficient of thermal expansion distinct from that of the material of said spindle hub;
permanent magnet means attached to the inside wall of said sleeve means;
stator means located within said sleeve means and fixedly attached to said stationary portion of said spindle bearing arrangement, said stator means being constructed and configured for interaction with said permanent magnet means;
means formed on at least one of said cavity and said sleeve means for fixedly attaching said sleeve means to said spindle hub within said cavity and for maintaining radial spacing between the inside cavity wall and the outside wall of the body portion of said sleeve means sufficient to allow for unconstrained thermal expansion of said spindle hub and said sleeve means relative to each other and prevent contact between said inside wall of said cavity and the outside wall of said body portion.

2. The disk drive of claim 1 wherein said outer surface of said spindle hub is generally cylindrical, said outer surface being provided with a lower edge, said spindle hub being provided with a hub shoulder extending generally radially from the lower edge of said spindle hub for receiving and supporting at least one disk member mounted on said spindle hub by means of a concentric bore having a diameter to correspond to the outer surface of said spindle hub.

3. The disk drive of claim 1 wherein said cavity includes a cylindrical wall and a sleeve mounting surface extending in a plane generally perpendicular to said axis of rotation and wherein said attaching means and said mounting surface include coacting means for enabling centering of said sleeve body portion relative to said cylindrical wall.

4. The disk drive of claim 3 wherein said coacting means includes an annulus formed on said sleeve mounting surface generally concentric to said axis of rotation, said sleeve means including a generally inwardly extending flange means having a central bore into which said annulus is inserted, said flange means, upon coacting engagement of said annulus, centering said sleeve relative to said axis of rotation.

5. The disk drive of claim 4 wherein said flange means is substantially a planar member with a plurality of identically circumferentially spaced apertures and said sleeve mounting surface is provided with an equal number of tapped apertures therein, said tapped apertures being aligned with the apertures in said flange so as to securely anchor said sleeve to said spindle hub by means of screws driven through said aligned apertures.

6. The disk drive of claim 4 or claim 5 wherein the diameter of said bore in said flange means and the predetermined outside diameter of said annulus are selected with a clearance therebetween so as to slidably mate said sleeve and said spindle hub.

7. The disk drive of claim 4 wherein the diameter of said bore in said flange means and the predetermined outside diameter of said annulus are chosen to produce a slight interference fit therebetween, thereby increasing the accuracy of positioning said sleeve relative to said axis of rotation.

8. The disk drive of claim 4 wherein the diameter of said bore in said flange means and the predetermined outside diameter of said annulus are chosen to produce a substantial degree of interference therebetween whereby said sleeve can be fitted onto said spindle hub by means of a heat shrink assembly operation, the junction between said sleeve and said spindle hub producing sufficient retaining force to hold said sleeve securely in place with respect to said spindle hub.

9. A disk drive comprising:
a spindle bearing arrangement mounted within said disk drive, said spindle bearing arrangement defining an axis of rotation and having a stationary portion and a rotatable portion;

a substantially non-magnetic spindle hub fixedly attached to said rotatable portion of said spindle bearing arrangement, said spindle hub having an outer surface for mounting disks, and including a cylindrical cavity defined by a cavity wall within the confines of said outer surface and concentric with said axis of rotation, said cavity having a floor;

a magnetically conductive sleeve member disposed within said cavity, said sleeve member having generally cylindrical inside and outside walls and made from a material having a coefficient of thermal expansion distinct from that of the material of said spindle hub;

permanent magnets attached to and around the inside wall of said sleeve member;

a stator located within said sleeve member and fixedly attached to said stationary portion of said spindle bearing arrangement, said stator constructed and configured for operative interaction with said permanent magnets; and means for fixedly securing said sleeve abutted against a sleeve mounting surface of said cavity and for maintaining a radial spacing of the outside wall of said sleeve from said cavity wall to allow for unconstrained differential thermal expansion between said sleeve and said spindle hub.

10. The disk drive of claim 9, wherein the floor of said cavity incorporates an annulus concentric with said axis of rotation and said sleeve includes a radially inwardly extending flange having a bore that accommodates said annulus to maintain said radial spacing between the outside wall of said sleeve and the cylindrical wall of said cavity.

11. The disk drive of claim 10, wherein said means for fixedly securing said sleeve comprises screws coacting with said flange and said spindle hub.

12. The disk drive of claim 10, wherein said means for fixedly securing said sleeve comprises an interference fit between said sleeve flange and said annulus.

* * * * *